No. 897,999. PATENTED SEPT. 8, 1908.
G. W. PATTEN.
OILING DEVICE FOR WHEELS.
APPLICATION FILED MAY 8, 1908.
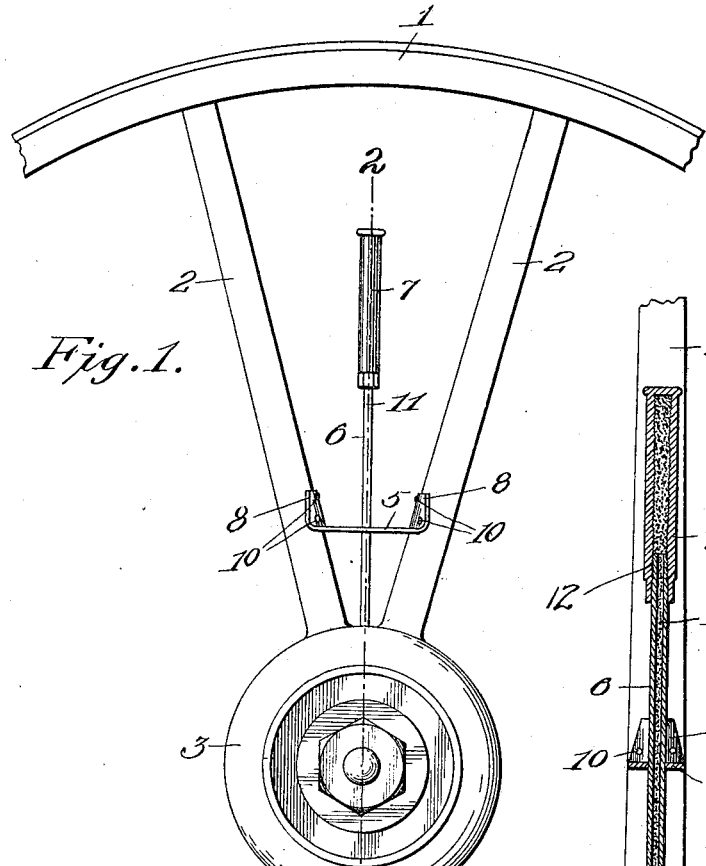
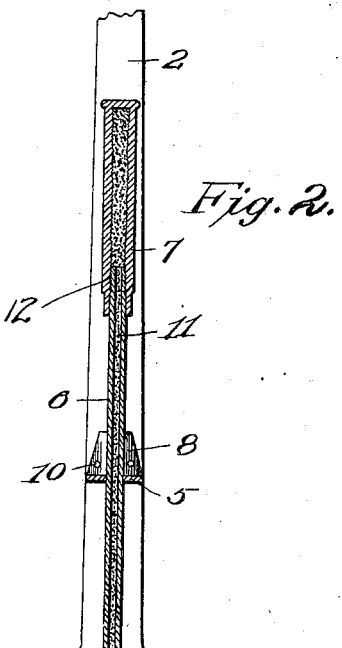
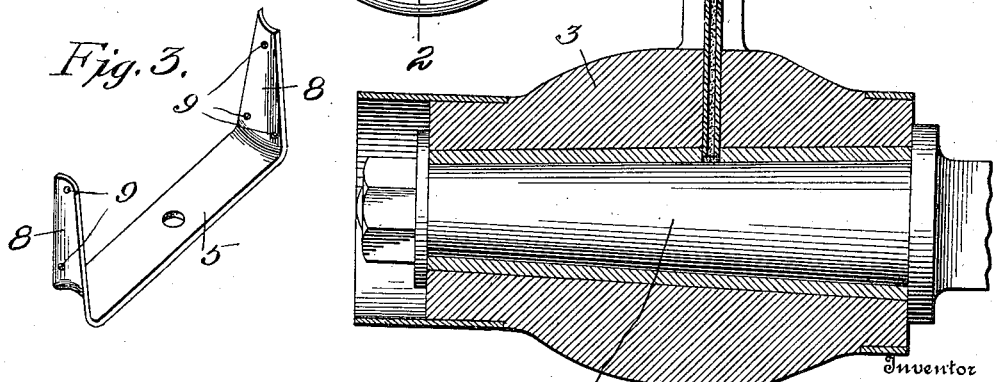
Witnesses
James F. Crown
M. L. Skinner.
Inventor
G. W. Patten
By Watson E. Coleman, Attorney

UNITED STATES PATENT OFFICE.

GEORGE W. PATTEN, OF WIMBLEDON, NORTH DAKOTA.

OILING DEVICE FOR WHEELS.

No. 897,999.  Specification of Letters Patent.  Patented Sept. 8, 1908.

Application filed May 8, 1908. Serial No. 431,671.

*To all whom it may concern:*

Be it known that I, GEORGE W. PATTEN, a citizen of the United States, residing at Wimbledon, in the county of Barnes and State of North Dakota, have invented certain new and useful Improvements in Oiling Devices for Wheels, of which the following is a specification, reference being had to the accompanying drawings.

My invention relates to improvements in devices for oiling or lubricating vehicle wheels without removing them from their spindles, and its object is to provide a simple and practical device of this character which may be readily applied to a wheel and which will be so positioned between the spokes that there will be little likelihood of it being knocked off or broken.

With the above and other objects in view, the invention consists of the novel features of construction and the combination and arrangement of parts hereinafter fully described and claimed, and illustrated in the accompanying drawings, in which Figure 1 is a side elevation of a portion of a wagon wheel showing the application of my invention thereto; Fig. 2 is a vertical section taken on the plane indicated by the line 2—2 in Fig. 1; and Fig. 3 is a detailed view of the supporting bracket.

While my invention may be applied to a wheel or the like of any description it is especially adapted for use upon the wheel of a wagon or similar vehicle.

In the drawings 1 denotes the rim, 2 the spokes and 3 the hub of a wheel, the hub being mounted for rotation upon a spindle or axle 4.

The invention comprises a supporting bracket 5 arranged between two of the spokes 2 and carrying a tubular body 6, the upper end of which carries a lubricant container 7 and the lower end of which extends into the hub 3 at a point between the spokes so as to feed grease or lubricant to the spindle. The bracket or support 5 is in the form of a metal plate the ends 8 of which are bent upwardly and outwardly at an angle, tapered toward their extremities and curved or rounded so as to fit the spokes 2, apertures 9 being formed in them for the reception of screws or similar fastenings 10 by means of which the bracket is securely fastened to the wheel. The tube 5 and its straight upper end 11 projects radially and has an externally screw threaded portion 12 to receive the container 7. The latter is in the form of a cap or cup adapted to receive a sufficient quantity of grease or other lubricant and provided in its open lower end, which telescopes the tubular body 6, with internal screw threads to engage the threads 12 upon the latter. It will be seen that by constructing the container in this manner it will serve to force the grease through the tubular body 6 when it is screwed inwardly upon the same.

By arranging the bracket or saddle 5 between the spokes and making the tubular body 6 straight and the lubricant container 7 comparatively long, it will be seen that the entire device will be disposed between the spokes and not be liable to be struck and bent, broken, or knocked off of the wheel.

Having thus described my invention what I claim is:

The combination with a wheel having a rim, a hub formed with a transverse opening arranged adjacent its inner end and in communication with its bore and spokes between the rim and hub, of a bracket plate arranged between two spokes and having angular ends secured to the latter, a tubular body arranged in said bracket plate and having its lower end arranged in the transverse opening in the hub and its upper end externally screw threaded, a lubricant container engaged with the threaded upper end of the body and adapted to force lubricant through the latter when it is screwed inwardly.

In testimony whereof I hereunto affix my signature in the presence of two witnesses.

GEORGE W. PATTEN.

Witnesses:
　WM. H. STEVENS,
　R. A. MORE.